US011308283B2

(12) United States Patent
Mahajan et al.

(10) Patent No.: US 11,308,283 B2
(45) Date of Patent: Apr. 19, 2022

(54) LIGHTWEIGHT TAGGING FOR DISJOINT ENTITIES

(71) Applicant: International Business Machines Corporation, Armonk, NY (US)

(72) Inventors: Diwakar Mahajan, New York, NY (US); Ananya Aniruddha Poddar, White Plains, NY (US); Bharath Dandala, White Plains, NY (US); Ching-Huei Tsou, Briarcliff Manor, NY (US)

(73) Assignee: International Business Machines Corporation, Armonk, NY (US)

( * ) Notice: Subject to any disclaimer, the term of this patent is extended or adjusted under 35 U.S.C. 154(b) by 206 days.

(21) Appl. No.: 16/777,426

(22) Filed: Jan. 30, 2020

(65) Prior Publication Data
US 2021/0240934 A1    Aug. 5, 2021

(51) Int. Cl.
| G06F 40/295 | (2020.01) |
| G06N 20/00 | (2019.01) |
| G06F 40/211 | (2020.01) |
| G06F 40/284 | (2020.01) |
| G06N 5/04 | (2006.01) |

(52) U.S. Cl.
CPC ......... *G06F 40/295* (2020.01); *G06F 40/211* (2020.01); *G06F 40/284* (2020.01); *G06N 5/04* (2013.01); *G06N 20/00* (2019.01)

(58) Field of Classification Search
CPC .......... G06F 16/3344; G06F 40/00–58; G06N 20/00; G06N 5/04

USPC ........................... 704/1, 9, 10, 257, 270–275
See application file for complete search history.

(56) References Cited

U.S. PATENT DOCUMENTS

| 2009/0249182 A1* | 10/2009 | Symington | ........... | G06F 40/295 |
| | | | | 715/209 |
| 2014/0280353 A1* | 9/2014 | Delaney | ................ | G06F 16/367 |
| | | | | 707/794 |
| 2015/0154284 A1* | 6/2015 | Pfeifer | ................ | G06F 16/3331 |
| | | | | 707/723 |
| 2019/0278777 A1* | 9/2019 | Malik | .................... | G06F 16/367 |
| 2021/0097237 A1* | 4/2021 | Saito | ....................... | G06F 40/30 |

FOREIGN PATENT DOCUMENTS

CN      108363816 A     8/2018

OTHER PUBLICATIONS

Tang, B., et al. "Recognizing and Encoding Disorder Concepts in Clinical Text using Machine Learning and Vector Space Model," CLEF, Sep. 2013, 8 pages.

(Continued)

*Primary Examiner* — Jesse S Pullias
(74) *Attorney, Agent, or Firm* — Scully, Scott, Murphy & Presser, P.C.; Anthony R. Curro

(57) ABSTRACT

Text data including at least named entities can be received. From the named entities, continuous entities, overlapping entities and disjoint entities can be identified. The overlapping entities can be transformed into continuous entities. The continuous entities, the transformed entities and the disjoint entities can be encoded. The encoded entities can be input to a machine learning language model to train the machine learning model to predict candidate entities. The predicted entities can be decoded to reconstruct the predicted entities.

15 Claims, 10 Drawing Sheets

(56) References Cited

OTHER PUBLICATIONS

Kim, D., et al., "A Neural Named Entity Recognition and Multi-Type Normalization Tool for Biomedical Text Mining", IEEE Access, v.7, Jun. 19, 2019, pp. 73729-73740.

Ju, M., et al., "A Neural Layered Model for Nested Named Entity Recognition", Proceedings of NAACL-HLT 2018, Jun. 1-6, 2018, pp. 1446-1459.

Wikipedia, "Dependency grammar", printed on Jan. 30, 2020, 8 pages, https://en.wikipedia.org/wiki/Dependency_grammar.

Rosario, B., et al., "Classifying Semantic Relations in Bioscience Texts", Proceedings of the 42nd Annual Meeting on Association for Computational Linguistics. Stroudsburg: Association for Computational Linguistics; 2004, Classifying semantic relations in bioscience texts, Jul. 2004, 8 pages.

Tang, B., et al., Recognizing disjoint clinical concepts in clinical text using machine learning-based methods, AMIA Symposium, Published online Nov. 5, 2015, 10 pages.

Li, F., et al., "Recognizing irregular entities in biomedical text via deep neural networks", Pattern Recognition Letters 10, Available online Jun. 13, 2017, pp. 105-113.

Lim, S., et al., "Drug drug interaction extraction from the literature using a recursive neural network", PLoS ONE 13(1), Published: Jan. 26, 2018, 17 pages.

Khin, N. P. P., et al., "Medical Concept Extraction: A Comparison of Statistical and Semantic Methods", SNPD 2017, Jun. 26-28, 2017, pp. 35-38, Kanazawa, Japan.

Dandala, B., et al., "Adverse Drug Events Detection in Clinical Notes by Jointly Modeling Entities and Relations Using Neural Networks", Drug Saf., Jan. 2019, pp. 135-146, 42(1).

Dandala, B., et al., "IBM Research System at TAC 2018: Deep Learning architectures for Drug-Drug Interaction extraction from Structured Product Labels", Proceedings of the 2018 Text Analysis Conference 2018, Published Feb. 2019, 9 pages.

* cited by examiner

LIGHTWEIGHT TAGGING FOR DISJOINT ENTITIES

FIELD

The present application relates generally to computers and computer applications, and more particularly to computer-implemented natural language processing (NLP).

BACKGROUND

Natural language processing (NLP) allows computers to process natural language data, allowing computers to analyze data, interact with humans and perform text and speech recognition, among others. A subtask of NLP can include entity or named entity recognition (NER), which identifies or classifies entities mentioned in text data, for example, unstructured text data. NER can employ tagging schemes to tag parts of a sentence, for example, to recognize or identify concepts expressed in the sentence and relationships among words or tokens in the sentence.

BRIEF SUMMARY

A computer-implemented method, in one aspect, may include receiving text data including at least named entities. The method may also include identifying from the named entities, continuous entities, overlapping entities and disjoint entities. The method may further include transforming the overlapping entities to continuous entities. The method may also include encoding the continuous entities, the transformed entities and the disjoint entities. The method may further include inputting the encoded entities to a machine learning language model to predict candidate entities. The method may further include decoding the predicted entities to reconstruct the predicted entities.

A system, in one aspect, may include a hardware processor and a memory device coupled with the hardware processor. The hardware processor can be configured to receive text data including at least named entities. The hardware processor can also be configured to identify from the named entities, continuous entities, overlapping entities and disjoint entities. The hardware processor can also be configured to transform the overlapping entities to continuous entities. The hardware processor can also be configured to encode the continuous entities, the transformed entities and the disjoint entities. The hardware processor can also be configured to input the encoded entities to a machine learning language model to predict candidate entities. The hardware processor can also be configured to decode the predicted entities to reconstruct the predicted entities.

In another aspect, a computer-implemented method can include receiving text data including at least named entities. The method can also include identifying from the named entities, continuous entities, overlapping entities and disjoint entities. The method can further include transforming the overlapping entities to continuous entities. The method can also include inputting the transformed entities and the continuous entities to a machine learning language model trained using encoded continuous entities, transformed entities and disjoint entities to predict candidate entities in the text data. The method can also include decoding the predicted candidate entities to reconstruct the predicted entities.

A computer readable storage medium storing a program of instructions executable by a machine to perform one or more methods described herein also may be provided.

Further features as well as the structure and operation of various embodiments are described in detail below with reference to the accompanying drawings. In the drawings, like reference numbers indicate identical or functionally similar elements.

DETAILED DESCRIPTION

Figure 1A:
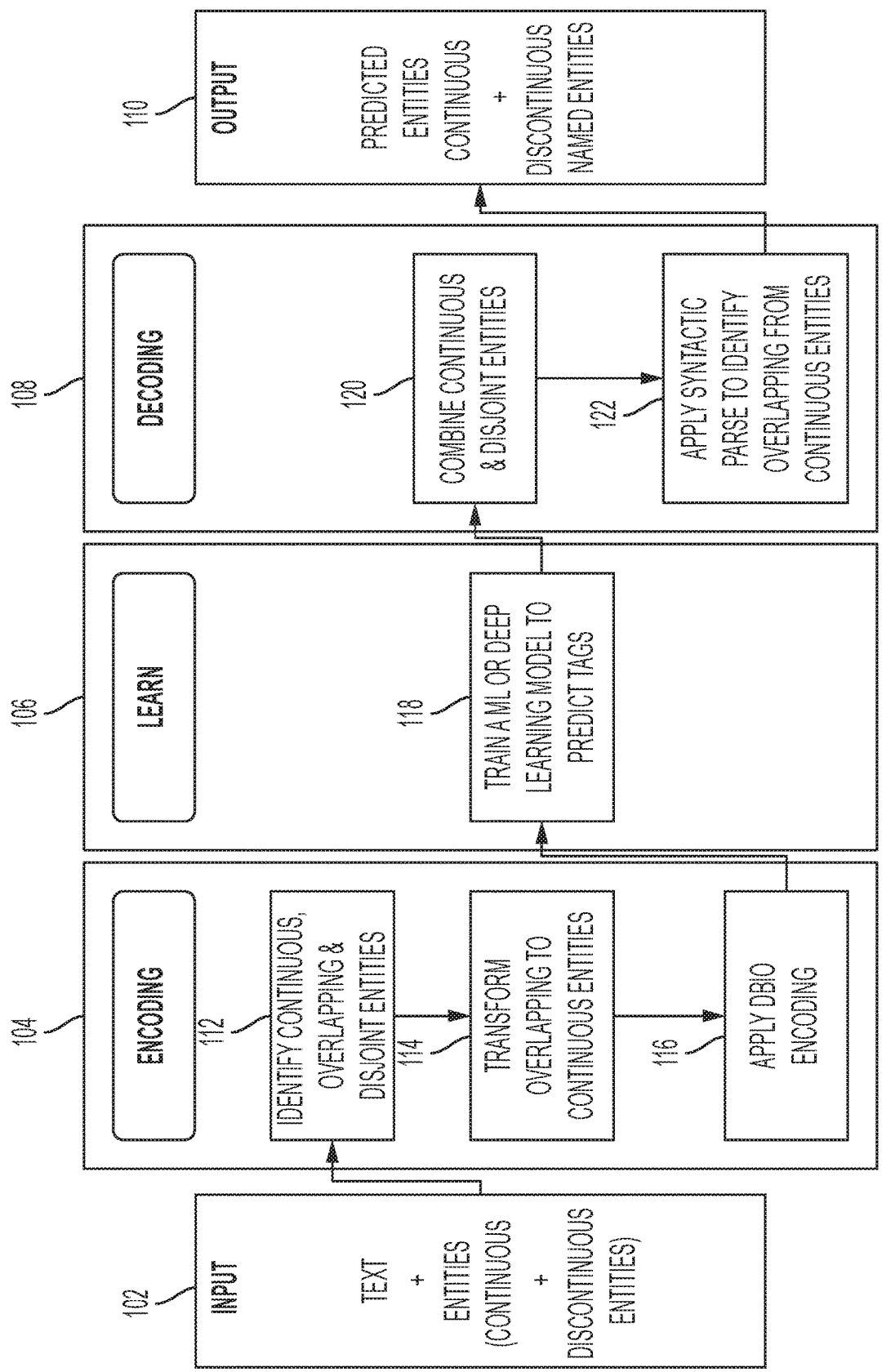
FIGS. 1A and 1B illustrate overviews of lightweight tagging methodology in one embodiment.

In embodiments, systems, methods and techniques are presented, which can provide a lightweight tagging scheme. The tagging scheme can be a near-lossless lightweight tagging scheme, which may effectively streamline the encoding and decoding process by an application of a hybrid model. In an embodiment, this technique decreases heterogeneity of concepts fed into a learning model, by converting "irregular" overlapping concepts or entities into "regular" continuous concepts or entities. This helps reduce label-sparsity issues, thereby improving natural language processing system accuracy and performance.

Named entity recognition (NER), also known as entity extraction is a task in Natural Language Processing (NLP) in order to identify and chunk entities into pre-defined classes. Entities, for example, refer to objects in a sentence, and can be domain dependent. A continuous concept refers to an entity that is expressed as a continuous sequence of words or token. An entity expressed as a set of discontiguous or discontinuous sequences with at least one gap is referred to as a discontinuous concept. The terms "continuous concept" and "continuous entity" are used interchangeably. The terms "discontinuous concept" and "discontinuous entity" are used interchangeably. By way of example, a biomedical named entity recognition (Bio-NER) can be a task in biomedical text mining, which can function as a building block of several downstream information mining applications such as medication-medication interactions and disease-treatment relations. As another example, clinical named entity recognition (Clinical-NER) can be a building block for downstream components such as adverse medication event extraction, medical concept extraction, clinical event classification and other tasks, for allowing healthcare providers a full understanding of the clinical events occurring across the patient medical records. Both Bio-NER and Clinical-NER can contain irregular entities. An irregular entity can be defined as an entity that contains discontinuous spans. While examples shown herein include text from medical literature, the systems, method and techniques can apply to any text appearing in any subject domains or areas, not limited to medical literature or domain.

In NLP, for example, named entities are regular concepts, with a continuous sequence of words. A continuous entity refers to a continuous sequence of words of interest or relating to a concept. Named entity recognition (NER) systems encode annotated concepts using tagging such as BIO tagging, where each token is assigned into one of the three labels: B means beginning, I means inside, and O means outside of a concept. However, BIO tagging may not be sufficient for an NER task as not all concepts may be regular, e.g., some may be irregular. Also, there can be different types of irregular concepts, e.g., overlapping entity and non-overlapping disjoint entity. An overlapping entity can be a group of two or more concepts that share a token or a phrase. As shown in Table 1, the two concepts P-gp|inducers and strong CYP3A4 inducers belong to a single overlapping entity as they share inducers. Non-overlapping disjoint entity can be an irregular concept which has no shared tokens with any other concept. As shown in Table 1, a single concept potentiating effect|reduction in dosage|discontinuation forms a single disjoint entity. The examples shown in Table 1 are examples of entity types in biomedical literature. The methodology disclosed herein, however, can work with data or text in any other domain. The delimiter "|" indicates disjoint entities are expressed in ground truth.

(2) "P-gp|inhibitors", "strong CYP3A inhibitors" "P-glycoprotein|inducers", "other CYP inducers"
Avoid/O concomitant/O use/O of/O ELIQUIS/O with/O P-gp/DB and/O strong/DB CYP3A/DI inhibitors/HB, as/O well/O as/O P-glycoprotein/DB and/O other/DB CYP/DI inducers/HB. In the above overlapping entities examples (1) and (2), each head entity (HB/HI) is combined with all other non-head entities to form disjoint concepts.

The following text illustrates an example in which there is more than one irregular or discontinuous entity in a sentence.
"P-gp|inhibitors", "strong CYP3A inhibitors" "P-glycoprotein|inducers", "other CYP inducers" Avoid/O concomitant/O use/O of/O ELIQUIS/O with/O P-gp/DB and/O CYP3A/DI inhibitors/HB, as/O well/O as/O P-glycoprotein/DB and/O other/DB CYP/DI inducers/HB The following text illustrates an example in which there is more than one head entity in a disjoint overlapping entity. "reduce|diuretic|effects", "reduce|antihypertensive effects"
The/O administration/O of/O nonsteroidal/O anti-inflammatory/O agent/O can/O reduce/HB the/O diuretic/DB, and/O antihypertensive/DB effects/HB of/O loop/O diuretics/O.

In an embodiment, a method, system and/or technology (referred to as a methodology for simplicity of explanation)

TABLE 1

| Type | Subtype | Sentence Text | Mention Text(s) |
| --- | --- | --- | --- |
| Regular | Continuous Entity | Coadministration of antiplatelet agents and chronic NSAID use increases ther isk of bleeding. | antiplatelet agents |
| Irregular | Overlapping Entity | Avoid concomitant use of ELIQUIS with P-gp and strong CYP3A4 inducers as it will decrease exposure to apixaban. | P-gp | inducers, strong CYP3A4 inducers |
| | Disjoint Entity | As the blood pressure falls under the potentiating effect of LASIX, a further reduction in dosage or even discontinuation of other antihypertensive medications may be necessary. | potentiating effect | reduction in dosage | discontinuation |

BIOHD tagging scheme is another tagging scheme which uses 7 labels {B I O HB HI DB DI} defined as follows:
HB and HI refer to tokens that are shared by multiple concepts. These tokens are the overlapped portions of disjoint concepts. These tokens or sequence of tokens are referred to as head components.
DB and DI refer to tokens that belong to disjoint concepts; however, these tokens are not shared by multiple concepts. These tokens or sequence of tokens are referred to as non-head components.
B and I are used to label the tokens that belong to continuous concepts and, O refers to tokens that are outside of concepts.

However, there can also be some ambiguity associated with the 7 label scheme. Other tagging schemes can add more complexity, for example, label sparsity, and/or training of an additional classification submodel.

The following illustrates example texts which are encoded with tags.
Continuous Entities:
(1) "antiplatelet agents"
Coadministration/O of/O antiplatelet/B agents/I and/O chronic/O NSAID/O use/O increases/O the/O risk/O of/O bleeding/O.
In the above example, BI can be merged to create a continuous concept.
Overlapping Entities:
(1) "P-gp|inhibitors", "strong CYP3A inhibitors" Avoid/O concomitant/O use/O of/O ELIQUIS/O with/O P-gp/DB and/O strong/DB CYP3A/DI inhibitors/HB.

can provide a hybrid tagging approach. During the encoding phase, the methodology may identify overlapping entities from shared concepts and merge them, thereby, converting them into continuous concepts. In this scheme, in an embodiment, no HB and HI tags are needed. This hybrid tagging approach in an embodiment also includes applying DB and DI tags on non-overlapping disjoint entities. During the decoding phase, the hybrid tagging approach can employ syntactic-parse based knowledge-injected pattern matching to extract entities.

In an embodiment, the methodology can include detection, encoding and decoding. The methodology can learn disjoint entities. Detection includes detecting irregular entities. Encoding includes transforming overlapping discontinuous concepts (E) into a single continuous concept m, and applying or performing a tagging scheme, for example, accurate tagging scheme. Decoding includes reconstructing overlapping discontinuous concepts (E) (also referred to as discontinuous or irregular entities such as a disjoint entity and/or overlapping entity) from continuous concept m, by applying one or more syntactic dependency parse-based patterns.

FIG. 1A is a diagram illustrating an overview of lightweight tagging methodology in one embodiment. This figure shows a learning stage of a machine learning model in one embodiment. The components shown can be executed by or executed on one or more processors such as hardware processors. One or more processors, for example, may include components such as programmable logic devices, microcontrollers, memory devices, and/or other hardware components, which may be configured to perform respective tasks described in the present disclosure. Coupled memory devices may be configured to selectively store instructions executable by one or more hardware processors. A processor may be a central processing unit (CPU), a graphics processing unit (GPU), a field programmable gate array (FPGA), an application specific integrated circuit (ASIC), another suitable processing component or device, or one or more combinations thereof. The processor may be coupled with a memory device. The memory device may include random access memory (RAM), read-only memory (ROM) or another memory device, and may store data and/or processor instructions for implementing various functionalities associated with the methods and/or systems described herein. The processor may execute computer instructions stored in the memory or received from another computer device or medium.

In an embodiment, a tagging scheme (referred to above as a hybrid tagging approach) includes 5 labels, {B I O DB DI}. The methodology in an embodiment applies these labels, for example, according to the type of the entity as described below:

Continuous entities: the methodology uses B and I tags to label tokens belonging to continuous concepts. "B" refers to begin. "I" refers to continuation entities appearing after a B tagged entity.

Disjoint entities: For non-overlapping disjoint entities, the methodology uses DB and DI tags to label the concepts. "DB" refers to "disjoint begin"; "DI" tag is used to tag a disjoint continuing entity, e.g., appearing after a DB tagged entity.

Overlapping entities: For an overlapping entity E which has a group of irregular concepts having shared token(s), the methodology merges the discontinuous spans of these concepts to form a merged continuous concept m. Start span of m is defined as the MIN($e_{start}$ in E) and end span of m is the MAX($e_{end}$ in E). The methodology replaces E with the merged and now continuous concept m. The methodology uses B and I tags to label m. Applying this technique to the overlapping entity example mentioned in Table 1, the two mentions P-gp|inhibitors and strong CYP3A4 inhibitors are merged into a single mention (entity) P-gp and strong CYP3A4 inhibitors.

Others/Non Entities: "O" is used to label tokens outside of the entities.

Referring to FIG. 1A, at 102, the methodology (or a system implementing the methodology) receives input including the ground truth data for an NER task. The input can be a combination of continuous and discontinuous entities. An example input may include a sentence text such as "Strong CYP3A inhibitors and other medications that, like XARELTO, impair hemostasis increases the risk of bleeding" and entities such as "a) strong CYP3A4 inhibitors, b) other medications that|impair hemostasis." In this example, (a) is a continuous entity while (b) is a discontinuous entity. An encoding process is shown at 104 in an embodiment. The encoding can include at 112, identifying (e.g., differentiating) continuous, overlapping and/or disjoint entities in the input. For instance, the methodology differentiates between different mention or entity types as continuous entities and irregular entities. Continuous entities are also referred to as regular entities. In an embodiment, a mention or entity, which is a single continuous sequence of word(s) forms a continuous entity. For addressing irregular entities, to recognize and differentiate between irregular entities, the methodology finds shared chunk(s) or token(s) between discontinuous mention spans. A group of two or more mentions sharing token(s) are termed overlapping entities. Any discontinuous concept not sharing any of its spans is termed as a disjoint entity. The methodology can parse the input, e.g., using a text or token parsing technique to identify continuous, overlapping and/or disjoint entities in the input.

The encoding can also include at 114, transforming overlapping discontinuous entities into continuous entities. For processing overlapping entities, e.g., in a sentence, for a set of entities E which have shared token(s), the methodology merges the discontinuous spans of the set of entities E to form a merged continuous entity m. For example, an input to a learning system is a) sentence text and b) entities. The encoding process classifies the entities into a) continuous b) overlapping and/or c) disjoint entities. The overlapping entities which share at least one token are grouped together into sets. Each such set forms set E for processing. The methodology replaces the set E with the merged and now continuous concept m. For example, consider the following sentence:

"Avoid concomitant use of P-gp and strong CYP3A4 inhibitors and inducers." E={"P-gp|inhibitors", "P-gp|inducers", "strong CYP3A4 inhibitors", "strong CYP3A4|inducers"}. E is transformed to m="P-gp and strong CYP3A4 inhibitors and inducers". The transformation generates a new entity instead of a group of overlapping entities E which share tokens.

The encoding can further include at 116, applying a DBIO encoding scheme to each entity type (e.g., continuous, overlapping and disjoint entities). For instance, the entities include regular and irregular. The irregular entities at this stage can include overlapping but are continuous (e.g., as a result of the transformation at 114) and disjoint entities. For continuous entities (including overlapping entities), the methodology uses B and I tags to label tokens belonging to continuous concepts. For disjoint entities, e.g., for non-overlapping disjoint entities, the methodology uses DB and DI tags to label the concepts. For others or non entities, the methodology uses O to label tokens outside of the above entities. The following illustrates an example. Sentence Text: "Strong CYP3A inhibitors and other medications that, like XARELTO, impair hemostasis increases the risk of bleeding." Entities: a) strong CYP3A4 inhibitors, b) other medications that|impair hemostasis. Encoding: Strong/B CYP3A/I inhibitors/I and/O other/DB medications/DI that/DI, like/O XARELTO/O, impair/DB hemostasis/DI increases/O the/O risk/O of/O bleeding/O.

Table 2 shows multiple irregular concepts in a sentence and identified mention or entity text(s) after performing the DBIO encoding process in one embodiment. The delimiter "|" indicates disjoint mentions as expressed in ground truth. The number of overlapping entities can be defined by the number of shared chunks. The four mentions in multiple overlapping entities example are merged into a single continuous concept, while in multiple overlapping and disjoint entities example, three entities are merged into two. These merged concepts are successfully reconstructed into the required mentions after a decoding process. Columns 2 and 3 (sentence text and mention text in ground truth) in Table 2 show examples of input received at 102. Column 4 (mention text after DBIO encoding) show examples of text of transformed entities.

TABLE 2

| Category | Sentence Text | Mention Text(s) as in the Ground Truth | Mention Text(s) after DBIO Encoding Process |
|---|---|---|---|
| Multiple Overlapping Entities | Avoid concomitant use of ELIQUIS with P-gp and strong CYP3A inhibitors, as well as P-glycoprotein and other CYP inducers. | P-gp \| inhibitors, strong CYP3A4 inhibitors, P- glycoprotein \| inducers, other CYP inducers \| inducers | P-gp and strong CYP3A4 inhibitors, P-glycoprotein and other CYP inducers |
| Multiple Overlapping & Disjoint Entities | Combined P-gp and strong CYP3A inhibitors and other medications that, like XARELTO, impair hemostasis increases the risk of bleeding. | P-gp \| inhibitors, strong CYP3A4 inhibitors, other medications that \| impair hemostasis | P-gp and strong CYP3A inhibitors, other medications that like XARELTO impair hemostasis |
| Multiple Disjoint Entities | LASIX has a tendency to antagonize the skeletal muscle relaxing effect of tubocurarine and may potentiate the action of succinylcholine | antagonize \| effect, potentiate \| action | antagonize \| effect, potentiate \| action |

Figure 2:
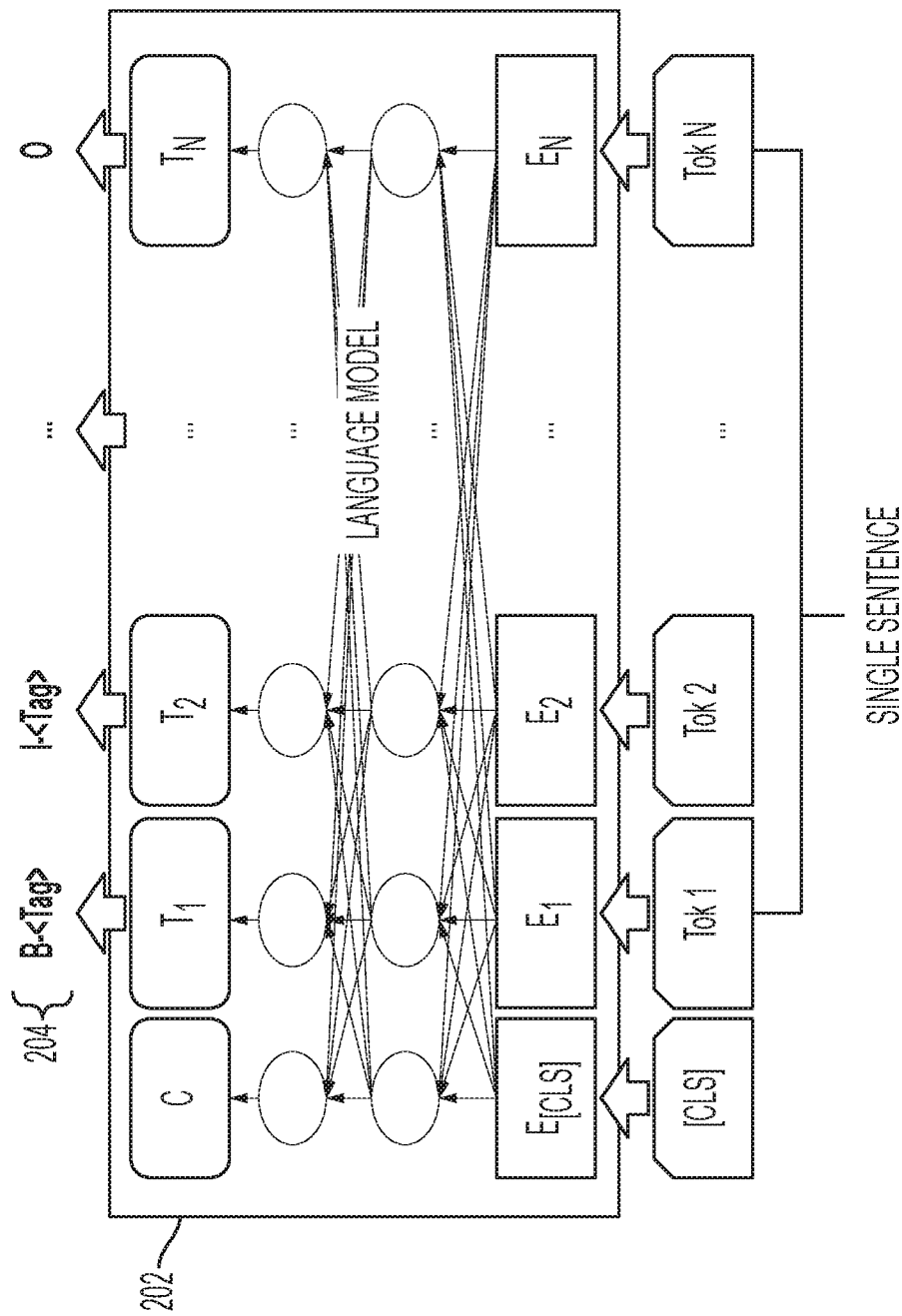
FIG. 2 shows a diagram illustrating an example of applying a language model to predict DBIO tags in an embodiment.

A learning process is shown at 106 to train a machine learning model or a deep learning model to predict DBIO tags and therefore, entities. The learning can include at 118, applying a machine-learning, for example, a deep learning, based learning system which predicts these entities. For instance, the methodology employs a deep learning based modeling technique to train a model to predict DBIO tags based on the output of the previous step (e.g., at 114). For example, the output of the previous step can be the merged entities (e.g., overlapping to continuous) and then encoded accordingly (DBIO encoding). The following illustrates an example:
Input:
a) Text: P-gp and Strong CYP3A4 inhibitors;
b) Entities: 1) P-gp inhibitors 2) Strong CYP3A4 inhibitors;
Merging and Encoding:
The two entities are merged and encoded as:
P-gp\B and\I Strong\I CYP3A4\inhibitors\I In an embodiment, the methodology can be utilized in two stages, e.g., learning stage and apply stage. In the learning stage, a machine learning model or a deep learning model can be trained. In this process, ground truth is provided, which includes a) text and b) entities in the text, e.g., as shown at 102. In the learning process, encoding is done to convert entities into tags as per the DBIO encoding scheme in an embodiment, a machine or deep learning algorithm is used to learn or train a model, predict the tags and decode the predicted tags to get entities. In the apply process, in an embodiment, no ground truth is available. The input to the system may be only text. In this process, the machine or deep learning model trained using the ground truth is run or applied to predict tags on the input text. In this process, the methodology may directly apply the machine or deep learning model trained in the learning process, predict the tags and then decode to get entities. FIG. 2 shows a diagram illustrating an example of applying a language model to predict DBIO tags in an embodiment. In an embodiment, the methodology may use an existing language model 202 to extract the contextualized embedding for each token, and add a fully connected layer on top of the existing language model 202 to classify each token into the mention type 204, e.g., DBIO tags. The weights in all the layers of the language model 202 can be updated during training.

Referring to FIG. 1A, a decoding process is shown at 108. The decoding can include at 120 combining continuous and disjoint entities, for example, predicted at 118. An example of a predicted output at 118 can be "P-gp\B and\I Strong\I CYP3A4\inhibitors\I", for example, predicted during an apply stage of the machine learning model. The decoding can also include at 122, applying a syntactic parse based decoding scheme on predicted entities and extracting overlapping entities from continuous ones.

During the decoding process, the methodology reconstructs, e.g., at 120, the continuous entities (e.g., all the continuous entities) by combining the B and I tags, and constructs a single disjoint entity by merging all disjoint components. In an embodiment, to extract overlapping entities from continuous concepts, the methodology applies a dependency parse-based syntactic pattern matching technique at 122.

The following example shows a reconstruction of an example continuous entity.
Input: Strong\B CYP3A4\inhibitors\I should\O not\O be\O used\O with\O Xarelto\O. Output: Strong CYP3A4 inhibitors.

The following example shows a reconstruction of a disjoint entity.
Input: As\O the\O blood\O pressure\O falls\O under\O the\O potentiating\DB effect\DI of\O LASIX\O, a\O further\O reduction\DB in\DI dosage\DI or\O even\O discontinuation\DB of\O other\O antihypertensive\O medications\O may\O be\O necessary\O. Output: Potentiating effect|reduction in dosage|discontinuation.

The tagging scheme, in an embodiment, allows for a simpler post-processing step for extracting overlapping entities, without burdening a model with the added complexity of multi-training steps or label sparsity issues.

Figure 3:
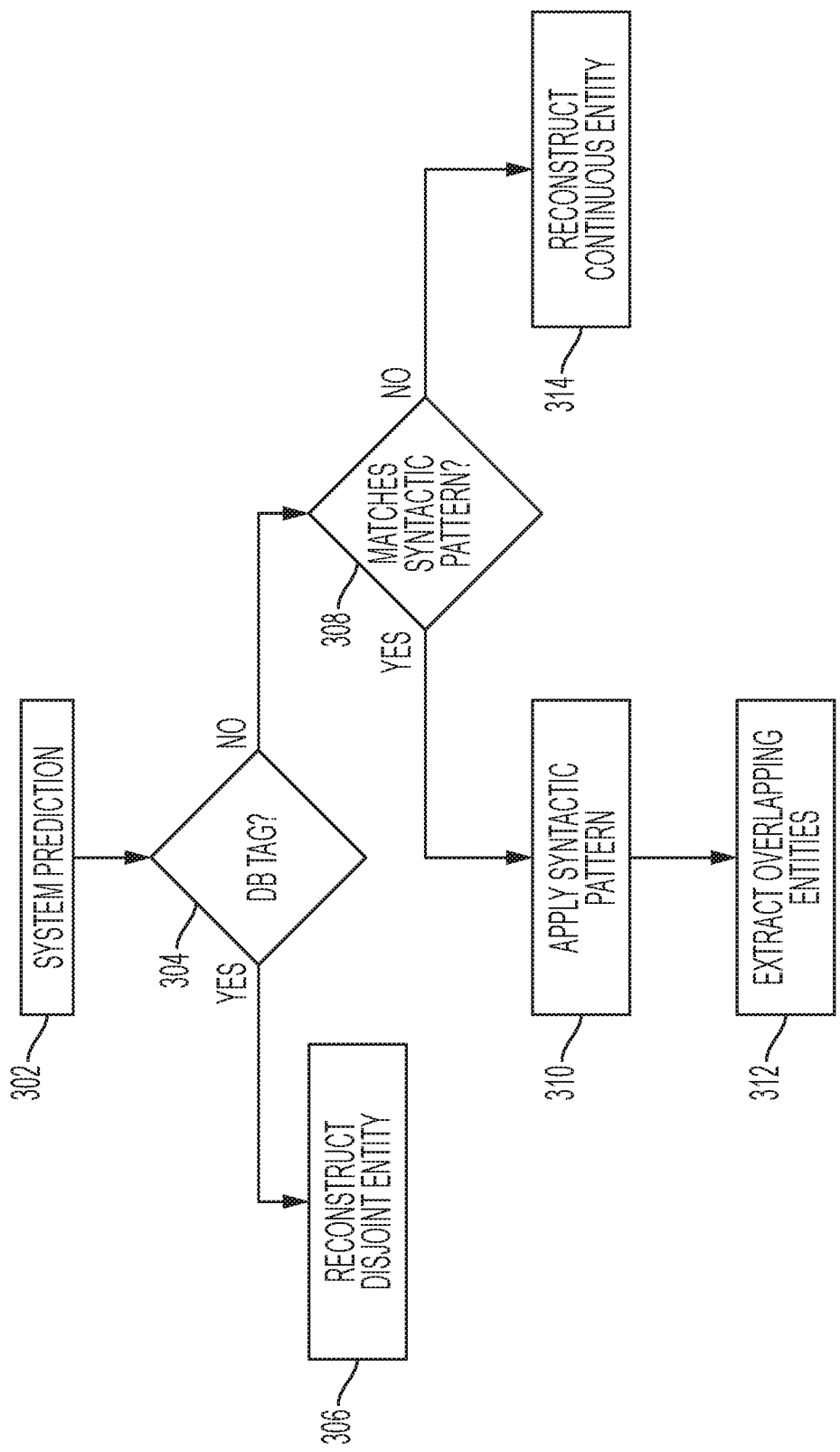
FIG. 3 shows a decoding process in one embodiment.

FIG. 3 shows a decoding process in one embodiment. The decoding process can include applying a syntactic parse based decoding scheme on predicted entities and extracting overlapping entities from continuous entities in one embodiment. At 302, one or more predicted entities are received, for example, predicted as shown at 118. At 304, it is determined whether a received predicted entity has a DB tag. DB tag indicates a disjoint begin entity. If so, at 306, the entity is reconstructed as a disjoint entity.

If the entity does not have a DB tag, at 308, it is determined whether the entity matches a syntactic pattern. In an embodiment, a set of empirically identified syntactic patterns, e.g., pre-existing patterns, are used to match the entity. If the entity matches a syntactic pattern, at 310, the method includes applying a syntactic pattern. At 312, the method includes extracting overlapping entities. If at 308, the entity does not match a syntactic pattern, at 314, the method includes reconstructing a continuous entity.

Extracting overlapping entities at 310 can include identifying shared chunks and segment chunks from span. Shared chunks refer to tokens, which are shared across irregular mentions. Segment chunks refer to tokens, which are unique to each irregular mention. Shared chunks and segment chunks can be identified by parsing a span. A span refers to a continuous set of words/tokens or a window of tokens. A syntactic parser can identify the chunks and assign them correct labels in a dependency parse tree. Extracting overlapping entities at 310 can also include merging each shared chunk with each segment chunk.

In an embodiment, the methodology employs a knowledge-injected syntactic pattern matching methodology to extract overlapping irregular entities from merged concepts. Given a continuous span, the methodology analyzes the text to identify whether it is an irregular concept, e.g., based on: the presence of a conjunction CCONJ (coordinating conjunction) in its dependency parse tree; and the presence of a mention, for example, of a domain, in the text's tokens. For instance, a medicine related mention can be medication label, its variant, a defined class of medication, a medication class interacting with the labeled medication.

In an embodiment, the methodology can use an existing parser to generate a dependency parse tree (syntactic pattern) for each mention text, and inject each token corresponding to a mention (e.g., medication-mention), e.g., with isMed=True. In an embodiment, the text of the mention or entity is an input to the dependency parsing methodology that matches the entity to a syntactic pattern. Dependency parsing automatically identifies dependency grammar of a text. In an embodiment, the decoding process utilizes these dependency parses' patterns. A knowledge based of a mention for a domain (e.g., medication mention knowledge base) can be constructed by extracting the generic name and medication class for each labeled medication and related medications.

The methodology can extract constituents (e.g., overlapping entities) from the identified irregular concepts, e.g., by identifying shared chunks and segment chunks from span. The methodology, for instance, identifies shared chunks, and segment chunks from the continuous span, where the tokens in the shared chunks are shared across the irregular concepts, while the tokens of the segment chunks are unique to each segment chunk. A text or token parsing technique can be used to extract constituents.

The methodology, for instance, also merges each shared chunk with each segment chunk to form discontinuous spans. For example, for the continuous mention span "P-gp and strong CYP3A inhibitors", the token "inhibitors" forms a shared chunk, "P-gp" is the first segment, and "strong CYP3A" is the second segment. Once identified, the shared chunk is merged with each segment chunk to form two discontinuous spans, e.g., "P-gp|inhibitors" and "strong CYP3A inhibitors".

Figure 4A:
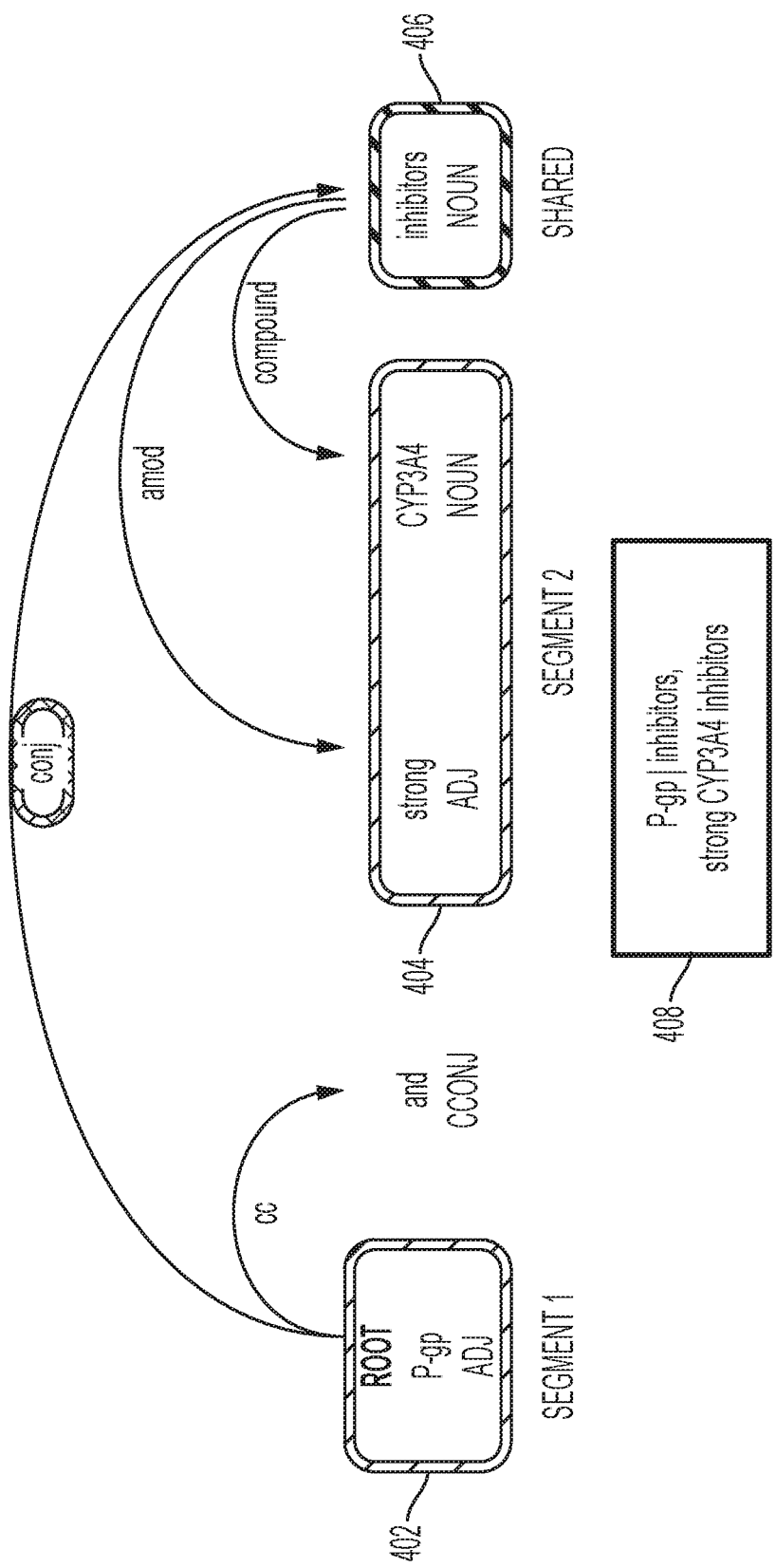
FIGS. 4A, 4B and 4C show examples of dependency parse-based syntactic patterns in an embodiment.
Figure 4B:
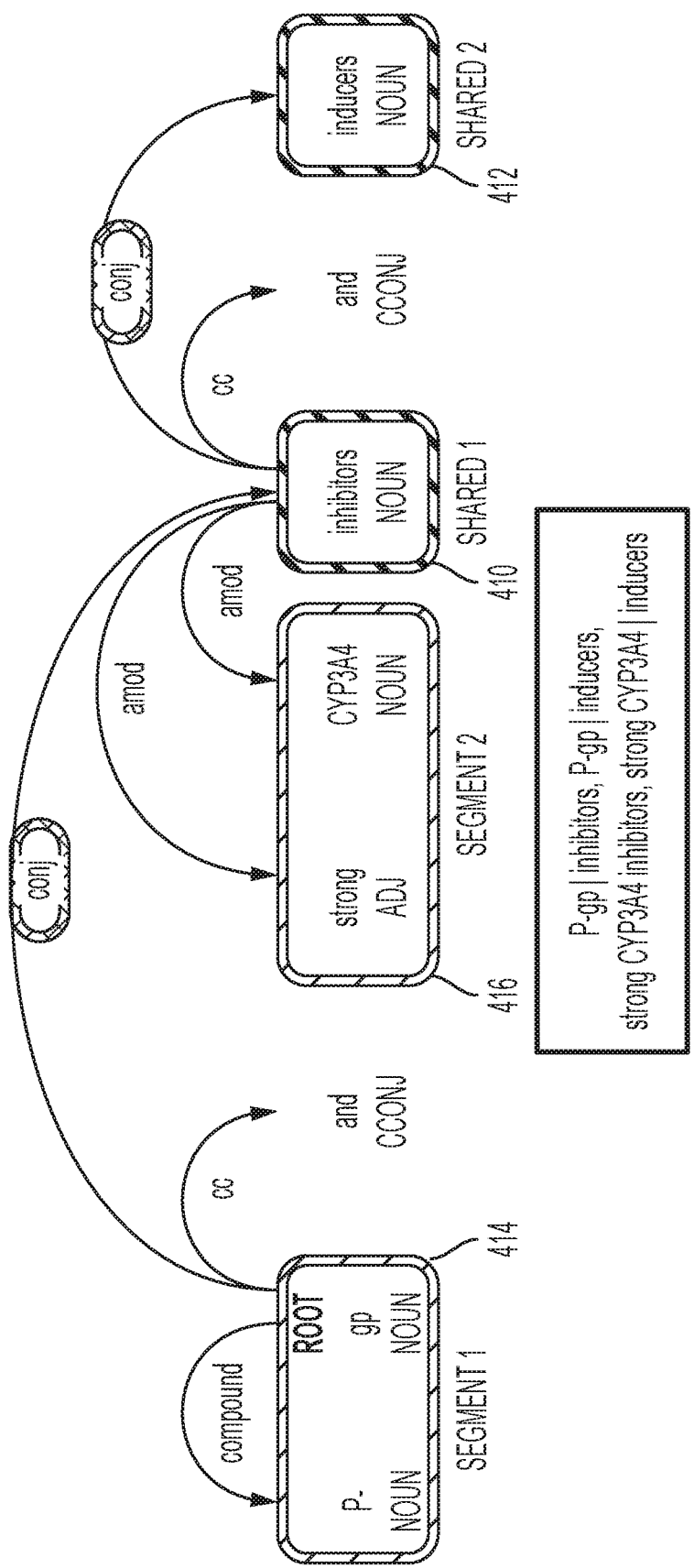
Figure 4C:
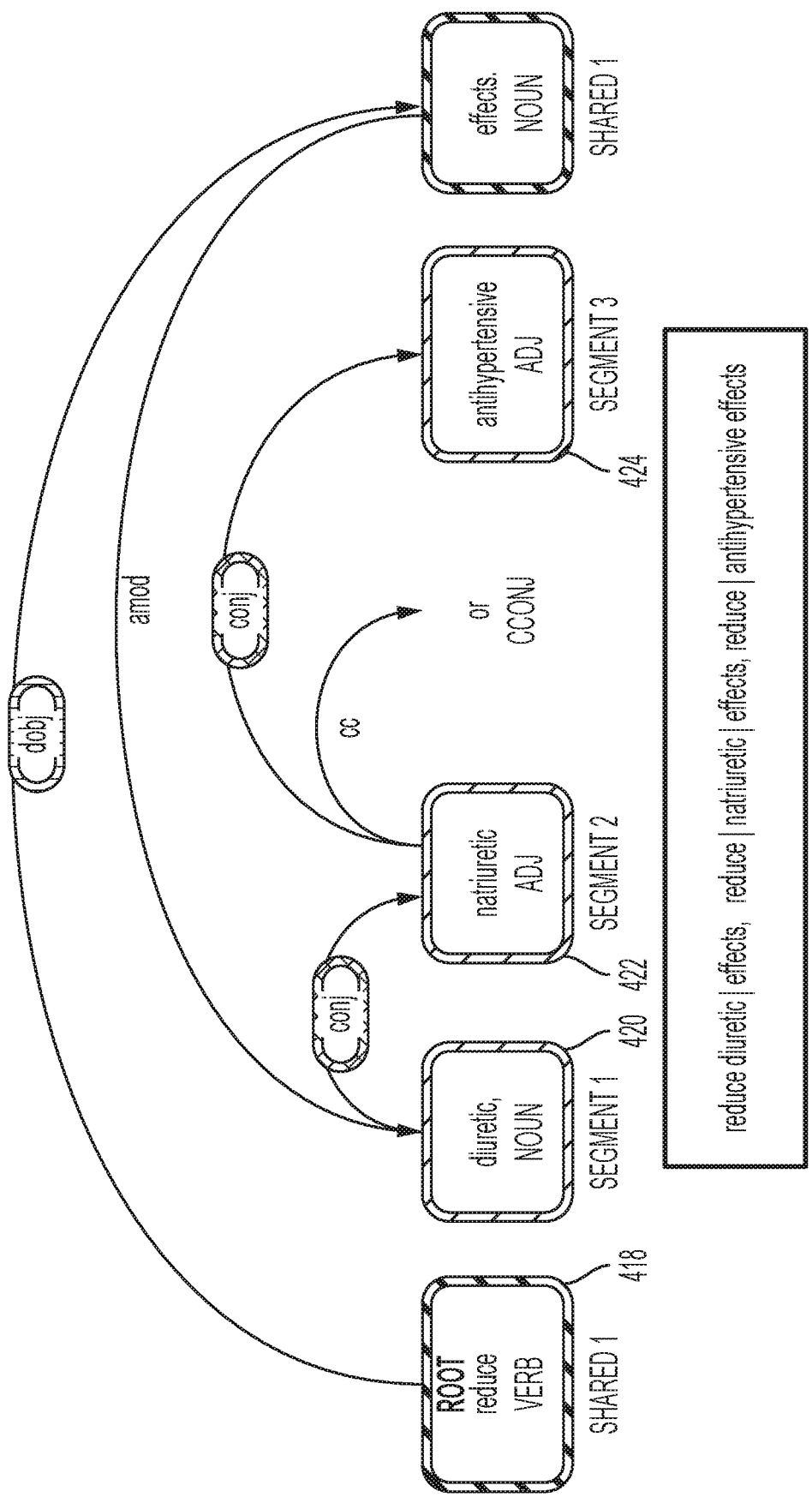

FIGS. 4A, 4B and 4C show examples of dependency parse-based syntactic patterns in an embodiment. In an embodiment, the patterns can be empirically identified. In FIG. 4A, segment 1 402 and segment 2 404 are identified, and a shared chunk 406 is identified. As shown at 408, the shared chunk 406 is merged with each segment chunk 402 and 404.

In FIG. 4B, each conj forms individual shared chunks 410, 412, while the root 414 and lefts (left immediate children) 416 of the shared chunks form the individual segment chunks. In an embodiment, in each chunk 410, 412, the compound for each token is also consumed.

In FIG. 4C, the root 418 of the sentence and its dobj (direct object) 410, 422, 424 are extracted to form a shared chunk, and each conj (coordinated token) form individual segment chunks 410, 422, 424.

Referring back to FIG. 1A, at 110 predicted entities can be output. The output predicted entities can include continuous and discontinuous named entities. In an embodiment, the predicted entities which are output have less overhead. For instance, having less variation in label space (e.g., 5 tokens such as DB, DI, B, I, O) can lead to less overhead and also less number of models.

Figure 1B:
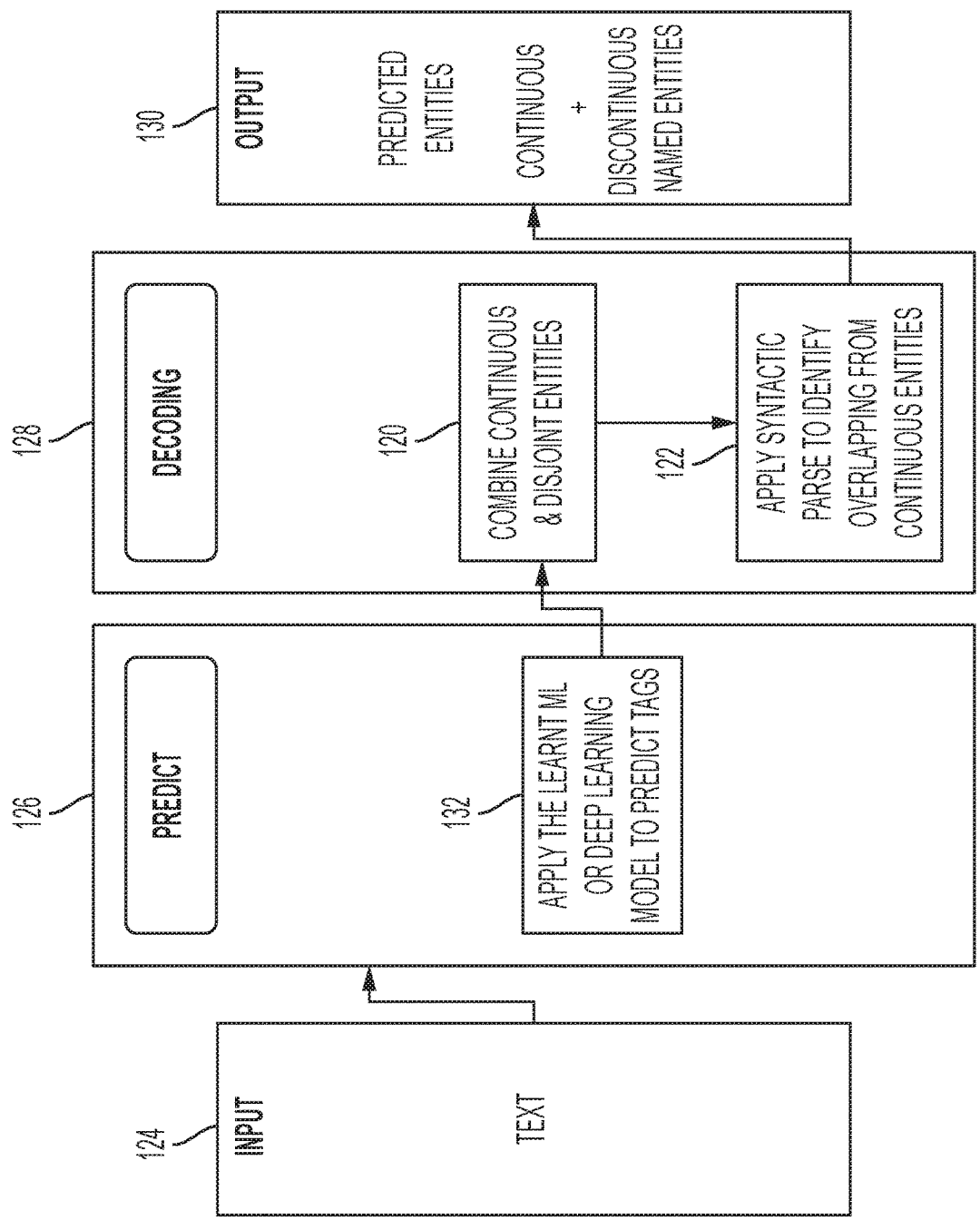

FIG. 1B is another diagram illustrating an overview of lightweight tagging methodology in one embodiment. This figure shows an apply stage of a machine learning model in one embodiment. In the apply process, in an embodiment, no ground truth is available. The input to the system may be only text, for example, as shown at 124. At 126, the machine or deep learning model trained using the ground truth (e.g., 118 FIG. 1A) is run or applied to predict tags on the input text. In this apply process, e.g., at 132, the methodology may directly apply the machine or deep learning model trained in the learning process and predict the tags, e.g., DBIO tags for the input text. The methodology, based on the predicted DBIO tags can obtain entities of the input text. At 128, the methodology includes decoding the predicted entities, for example, as similarly to the process described with reference to 108, 120 and 122 in FIG. 1A. The predicted entities are output at 130.

While the above example used medical related text, the methodology can work with other text in other domains. The methodology recognizes discontinuous concepts in text. The methodology can include a pre-processing methodology (e.g., a simple pre-processing methodology) of encoding or tagging discontinuous concepts. The methodology can also include a post-processing methodology of decoding the encoded or tagged concepts. In an aspect, the methodology is lightweight because it can eliminate the need for multiple step or multiple model approach or large encoding space for handling discontinuous concepts. By reducing the encoding space, the methodology allows a machine learning such as a deep learning model to learn better with considerably less training data. In an aspect, the cost associated with obtaining labeled data for training a machine learning model can be reduced.

The methodology in an embodiment includes defining new concept categories: e.g., identifying different types of discontinuous concepts (overlapping and disjoint concepts). The methodology in an embodiment also includes applying a tagging scheme to the newly defined concept categories. For example, the methodology can cover overlapping concepts to continuous concepts using BIO encoding and disjoint concepts using DBIO encoding. The methodology in an embodiment can perform domain specific parsing for decoding identified concepts. For example, continuous concepts can be decoded into: overlapping concepts and continuous concepts. Disjoint concepts can be merged (e.g., DB-DI merged with every other DB-DI tags). The methodology in an embodiment provides lightweight encoding and decoding of discontinuous concepts for a more accurate sequence machine learning system.

The disclosed tagging scheme in NER disclosed herein can be used in different subject domain areas and aid in efficiently analyzing text and automating text and concept recognition in computer-implemented NLP. An example application can be in medical related field, where text such as Structured Product Labeling (SPL) documents, e.g., in extended markup language (XML) format can be converted to computer-readable data, for example, for effective automated analysis and deployment of medication safety information. The methodology can aid in concept extraction and relation extraction of interactions, for example, automatic extraction of medication interactions.

Figure 5:
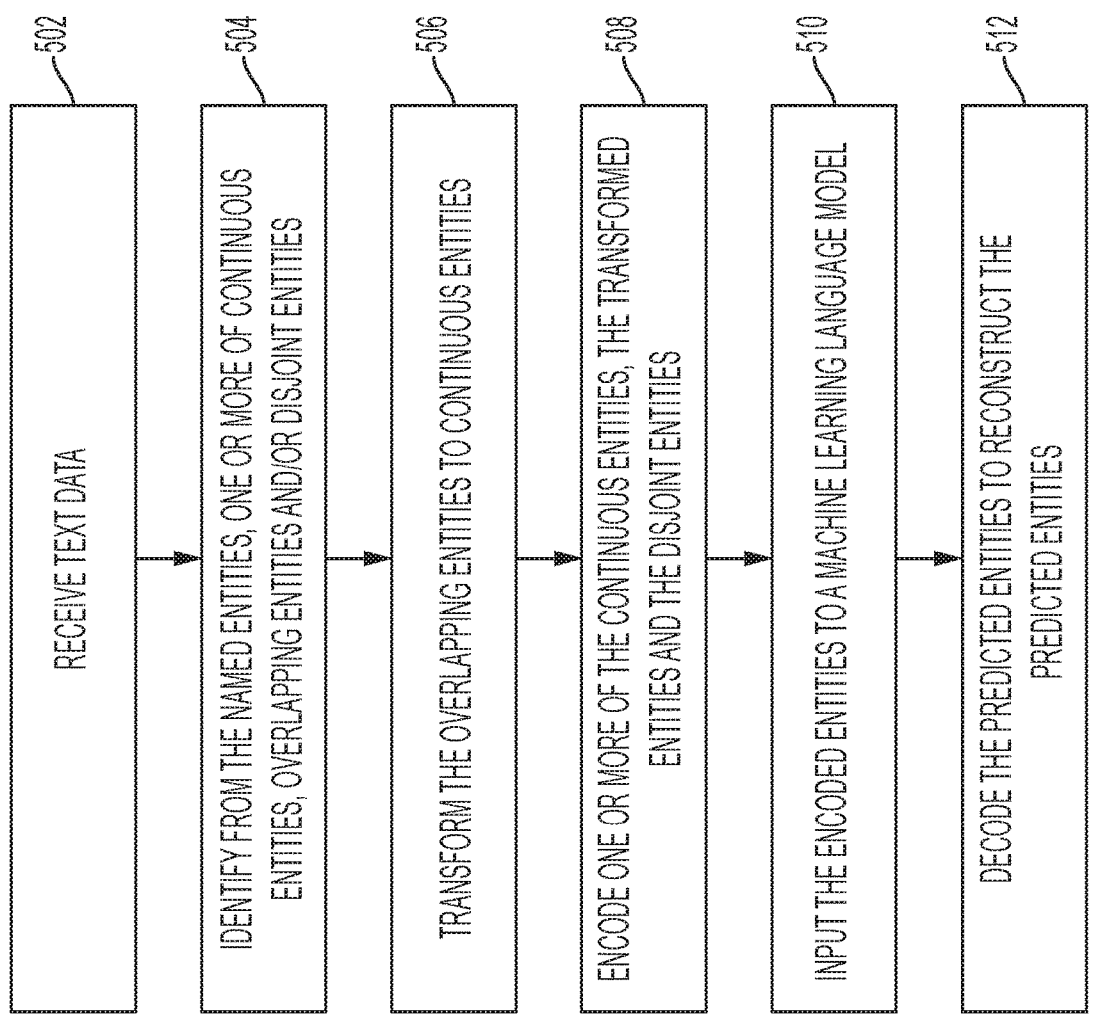
FIG. 5 is a flow diagram illustrating a method of tagging entities in one embodiment.

FIG. 5 is a flow diagram illustrating a method of tagging entities in one embodiment. At 502, the method can include receiving text data. The text data can include at least named entities, for example, objects of interest in the text, for instance, pertaining to a domain. The text data, for example, can include any one or more of continuous entities, overlapping entities and/or disjoint entities. An overlapping entity can be a group of two or more concepts that share a token or a phrase. A disjoint entity can be an irregular concept which has no shared tokens with any other concept. A continuous entity refers to a continuous sequence of words of interest or relating to a concept.

At 504, the method can include identifying from the named entities, one or more of continuous entities, overlapping entities and/or disjoint entities. For instance, the received input text data need not have all those types, and the method processes the types (e.g., continuous, overlapping, disjoint entity types) that are identified.

At 506, the method can include transforming the overlapping entities to continuous entities. For example, to transform the overlapping entities, the method can include identifying a set of entities which have a shared token and merging the set of entities into a continuous entity.

At 508, the method can include encoding the continuous entities, the transformed entities and the disjoint entities. Encoding can use a DBIO encoding scheme. For example, B and I tags are used to label tokens belonging to the continuous entities; DB and DI tags are used to label the disjoint entities; and O is used to label tokens outside of continuous entities and disjoint entities.

At 510, the method can include inputting the encoded entities to a machine learning language model to train the model to predict candidate entities, for example, in a given sentence or text. For example, the method can also include training the machine learning language model using a training data set including DBIO encoded text data. The machine learning model can also be automatically retrained, for example, based on feedback. During an apply stage, for example, the trained model can be applied to predict entities or DBIO tags (thereby entities) given a text (e.g., without encoding).

At 512, the method can include decoding the predicted entities to reconstruct the predicted entities, e.g., into a format of the received text data. To decode, the method can include determining whether an entity has a DB tag, and responsive to determining that the entity has a DB tag, reconstructing the entity as a disjoint entity. Responsive to determining that the entity does not have a DB tag, the method can include determining whether the entity matches a syntactic pattern. Responsive to determining that the entity matches the syntactic pattern, the method can include applying the syntactic pattern. Applying the syntactic pattern extracts the overlapping entities. For instance, the method can extract the overlapping entities by using a syntactic pattern. Responsive to determining that the entity does not match a syntactic pattern, the method can include reconstructing the entity as a continuous entity.

Figure 6:
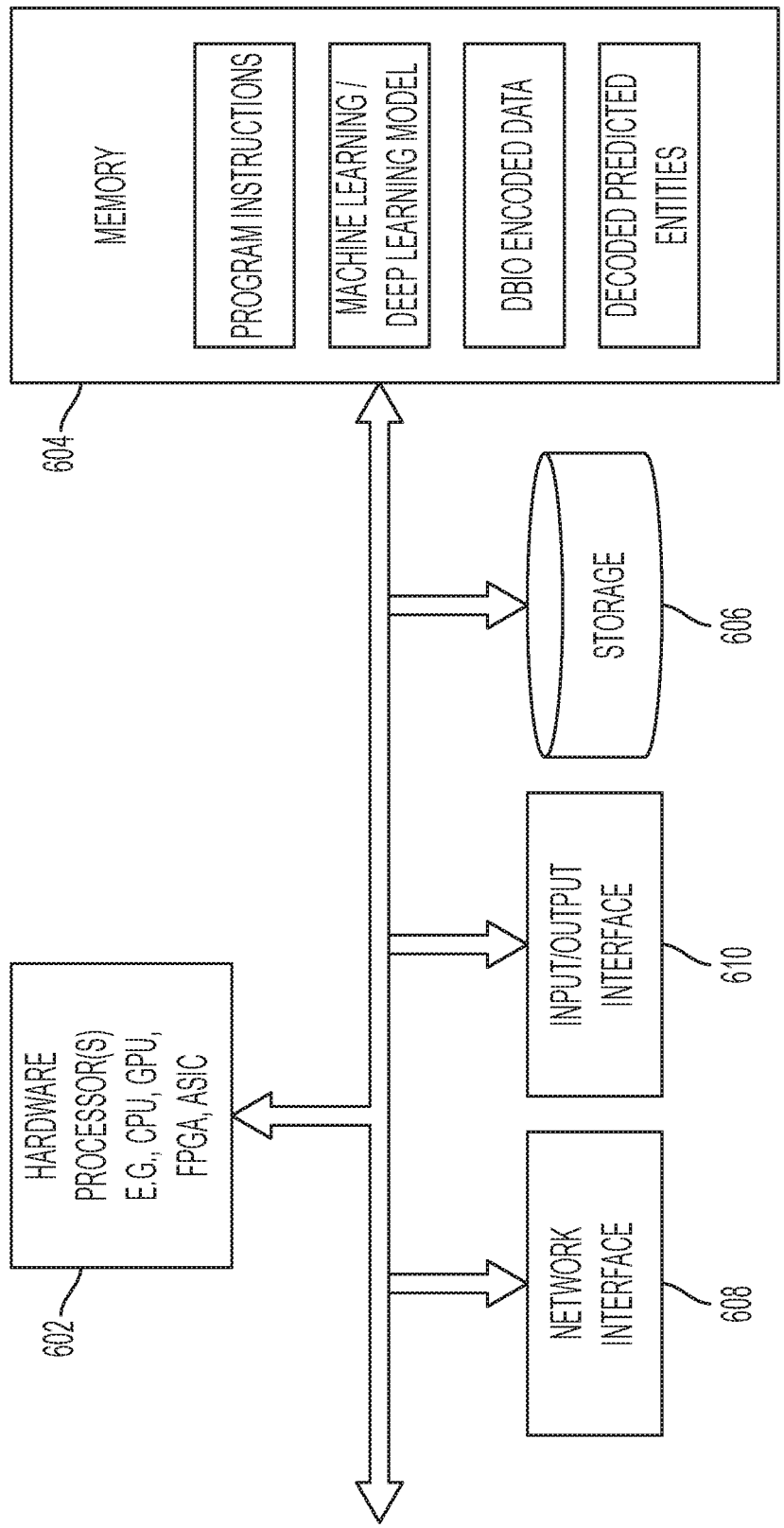
FIG. 6 is a diagram showing components of a system in an embodiment, which can perform tagging of entities in a given text.

FIG. 6 is a diagram showing components of a system in one embodiment that can perform tagging of entities in a given text. One or more hardware processors 602 such as a central processing unit (CPU), a graphic process unit (GPU), and/or a Field Programmable Gate Array (FPGA), an application specific integrated circuit (ASIC), and/or another processor, may be coupled with a memory device 604, and perform tagging of entities. A memory device 604 may include random access memory (RAM), read-only memory (ROM) or another memory device, and may store data and/or processor instructions for implementing various functionalities associated with the methods and/or systems described herein. One or more processors 602 may execute computer instructions stored in memory 604 or received from another computer device or medium. A memory device 604 may, for example, store instructions and/or data for functioning of one or more hardware processors 602, and may include an operating system and other program of instructions and/or data. One or more hardware processors 602 may receive input, which can include ground truth data such as continuous and discontinuous named entities (e.g., regular and irregular entities). For instance, at least one hardware processor 602 may detect one or more of continuous, overlapping and/or disjoint entities in the given input, transform overlapping entities, if present, to continuous entities, and apply a DBIO encoding scheme. In an aspect, a machine learning model trained to predict entities in a sequence of words can be run to predict a next or candidate entity with DBIO encoding. The entities including the predicted entities can be decoded, for example, by combining continuous and disjoint entities. Decoding can also include applying syntactic pattern to identify overlapping from continuous entities. In an aspect, input data may be stored in a storage device 606 or received via a network interface 608 from a remote device, and may be temporarily loaded into a memory device 604 for encoding with DBIO tagging. The encoded input can be stored on a memory device 604, for example, for use by one or more hardware processors 602, for example, for input to a machine learning model. One or more hardware processors 602 may be coupled with interface devices such as a network interface 608 for communicating with remote systems, for example, via a network, and an input/output interface 610 for communicating with input and/or output devices such as a keyboard, mouse, display, and/or others.

Figure 7:
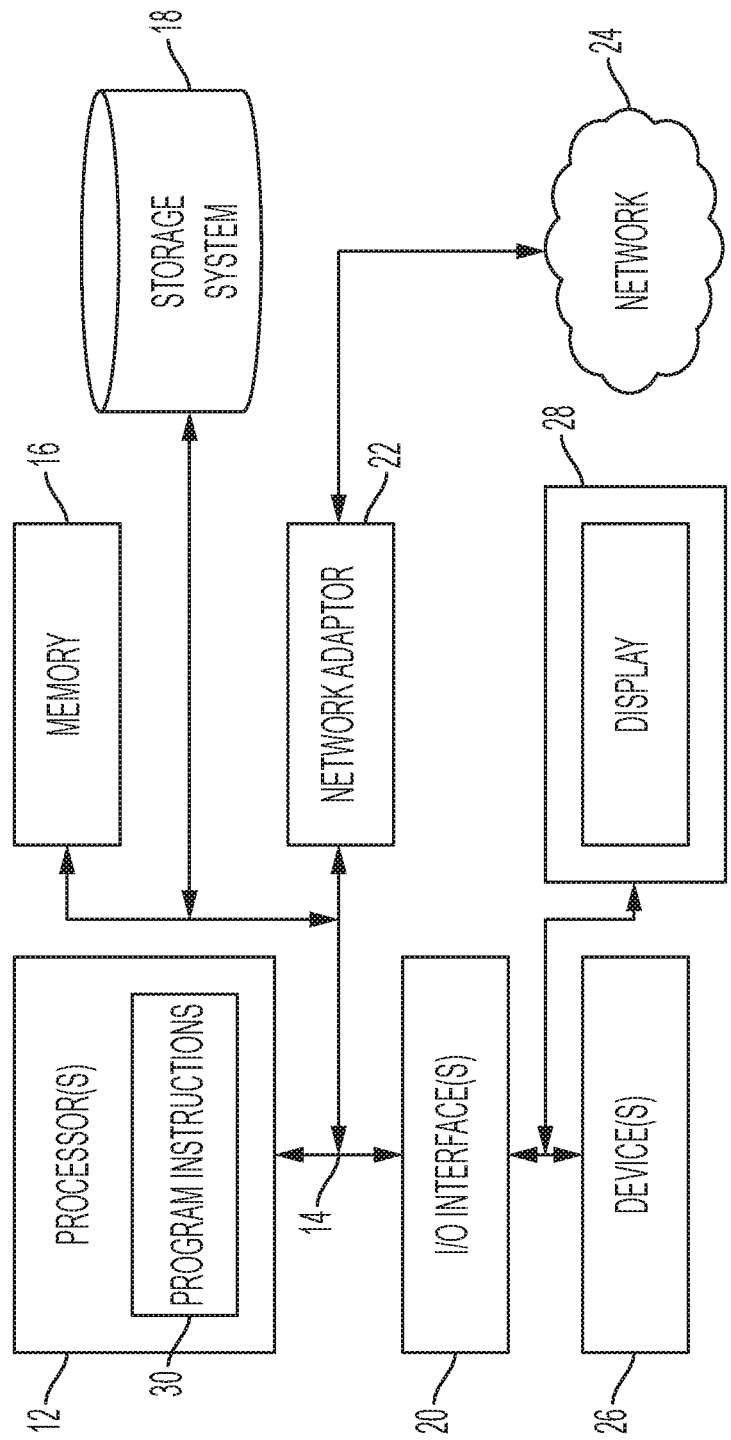
FIG. 7 illustrates a schematic of an example computer or processing system that may implement a system in one embodiment.

FIG. 7 illustrates a schematic of an example computer or processing system that may implement a system in one embodiment. The computer system is only one example of a suitable processing system and is not intended to suggest any limitation as to the scope of use or functionality of embodiments of the methodology described herein. The processing system shown may be operational with numerous other general purpose or special purpose computing system environments or configurations. Examples of well-known computing systems, environments, and/or configurations that may be suitable for use with the processing system shown in FIG. 7 may include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

The computer system may be described in the general context of computer system executable instructions, such as program modules, being executed by a computer system. Generally, program modules may include routines, programs, objects, components, logic, data structures, and so on that perform particular tasks or implement particular abstract data types. The computer system may be practiced in distributed cloud computing environments where tasks are performed by remote processing devices that are linked through a communications network. In a distributed cloud computing environment, program modules may be located in both local and remote computer system storage media including memory storage devices.

The components of computer system may include, but are not limited to, one or more processors or processing units 12, a system memory 16, and a bus 14 that couples various system components including system memory 16 to processor 12. The processor 12 may include a module 30 that performs the methods described herein. The module 30 may be programmed into the integrated circuits of the processor 12, or loaded from memory 16, storage device 18, or network 24 or combinations thereof.

Bus 14 may represent one or more of any of several types of bus structures, including a memory bus or memory controller, a peripheral bus, an accelerated graphics port, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnects (PCI) bus.

Computer system may include a variety of computer system readable media. Such media may be any available media that is accessible by computer system, and it may include both volatile and non-volatile media, removable and non-removable media.

System memory 16 can include computer system readable media in the form of volatile memory, such as random access memory (RAM) and/or cache memory or others. Computer system may further include other removable/non-removable, volatile/non-volatile computer system storage media. By way of example only, storage system 18 can be provided for reading from and writing to a non-removable, non-volatile magnetic media (e.g., a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 14 by one or more data media interfaces.

Computer system may also communicate with one or more external devices 26 such as a keyboard, a pointing device, a display 28, etc.; one or more devices that enable a user to interact with computer system; and/or any devices (e.g., network card, modem, etc.) that enable computer system to communicate with one or more other computing devices. Such communication can occur via Input/Output (I/O) interfaces 20.

Still yet, computer system can communicate with one or more networks 24 such as a local area network (LAN), a general wide area network (WAN), and/or a public network (e.g., the Internet) via network adapter 22. As depicted, network adapter 22 communicates with the other components of computer system via bus 14. It should be understood that although not shown, other hardware and/or software components could be used in conjunction with computer system. Examples include, but are not limited to: microcode, device drivers, redundant processing units, external disk drive arrays, RAID systems, tape drives, and data archival storage systems, etc.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be accomplished as one step, executed concurrently, substantially concurrently, in a partially or wholly temporally overlapping manner, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. As used herein, the term "or" is an inclusive operator and can mean "and/or", unless the context explicitly or clearly indicates otherwise. It will be further understood that the terms "comprise", "comprises", "comprising", "include", "includes", "including", and/or "having," when used herein, can specify the presence of stated features, integers, steps, operations, elements, and/or components, but do not preclude the presence or addition of one or more other features, integers, steps, operations, elements, components, and/or groups thereof. As used herein, the phrase "in an embodiment" does not necessarily refer to the same embodiment, although it may. As used herein, the phrase "in one embodiment" does not necessarily refer to the same embodiment, although it may. As used herein, the phrase "in another embodiment" does not necessarily refer to a different embodiment, although it may. Further, embodiments and/or components of embodiments can be freely combined with each other unless they are mutually exclusive.

The corresponding structures, materials, acts, and equivalents of all means or step plus function elements, if any, in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A computer-implemented method comprising:
receiving text data including at least named entities;
identifying from the named entities, continuous entities, overlapping entities and disjoint entities;
transforming the overlapping entities to continuous entities;
encoding the continuous entities, the transformed entities and the disjoint entities;
inputting the encoded entities to a machine learning language model to predict candidate entities; and
decoding the predicted entities to reconstruct the predicted entities,
wherein the encoding uses a DBIO encoding scheme, wherein B and I tags are used to label tokens belonging to the continuous entities, DB and DI tags are used to label the disjoint entities, and O is used to label tokens outside of continuous entities and disjoint entities,
wherein the decoding includes determining whether an entity has a DB tag, and responsive to determining that the entity has a DB tag, reconstructing the entity as a disjoint entity.

2. The method of claim 1, wherein the transforming the overlapping entities includes identifying a set of entities which have a shared token and merging the set of entities into a continuous entity.

3. The method of claim 1, wherein responsive to determining that the entity does not have a DB tag, determining whether the entity matches a syntactic pattern,
responsive to determining that the entity matches the syntactic pattern, applying the syntactic pattern, the applying extracting the overlapping entities.

4. The method of claim 3, wherein responsive to determining that the entity does not match the syntactic pattern, reconstructing a continuous entity.

5. The method of claim 1, further including training the machine learning language model using a training data set including DBIO encoded text data.

6. A system comprising:
a hardware processor;
a memory device coupled with the hardware processor;
the hardware processor configured to:
receive text data including at least named entities;
identify from the named entities, continuous entities, overlapping entities and disjoint entities;
transform the overlapping entities to continuous entities;
encode the continuous entities, the transformed entities and the disjoint entities;
input the encoded entities to a machine learning language model to predict candidate entities; and
decode the predicted entities to reconstruct the predicted entities,
wherein the hardware processors is configured to use a DBIO encoding scheme to encode, wherein B and I tags are used to label tokens belonging to the continuous entities, DB and DI tags are used to label the disjoint entities, and O is used to label tokens outside of continuous entities and disjoint entities, wherein the DBIO encoding scheme excludes H tags that label head entities.

7. The system of claim 6, wherein the hardware processors is configured to identify a set of entities which have a shared token and merge the set of entities into a continuous entity, to transform the overlapping entities.

8. The system of claim 6, wherein to decode, the hardware processors is configured to determine whether an entity has a DB tag, and responsive to determining that the entity has a DB tag, reconstruct the entity as a disjoint entity.

9. The system of claim 8, wherein responsive to determining that the entity does not have a DB tag, the hardware processors is configured to determine whether the entity matches a syntactic pattern,
responsive to determining that the entity matches the syntactic pattern, the hardware processors is configured to apply the syntactic pattern, applying the syntactic pattern extracting the overlapping entities.

10. The system of claim 9, wherein responsive to determining that the entity does not match the syntactic pattern, the hardware processors is configured to reconstruct a continuous entity.

11. The system of claim 6, wherein the hardware processors is further configured to train the machine learning language model using a training data set including DBIO encoded text data.

12. A computer program product comprising a computer readable storage medium having program instructions embodied therewith, the program instructions executable by a device to cause the device to:
receive text data including at least named entities;
identify from the named entities, continuous entities, overlapping entities and disjoint entities;
transform the overlapping entities to continuous entities;
encode the continuous entities, the transformed entities and the disjoint entities;
input the encoded entities to a machine learning language model trained using encoded continuous entities, transformed entities and disjoint entities to predict candidate entities; and
decode the predicted entities to reconstruct the predicted entities,
wherein the device is caused to train the machine learning model using a DBIO encoding scheme, wherein B and I tags are used to label tokens belonging to the continuous entities, DB and DI tags are used to label the disjoint entities, and O is used to label tokens outside of continuous entities and disjoint entities,
wherein to decode, the device is caused to determine whether an entity has a DB tag, and responsive to determining that the entity has a DB tag, reconstruct the entity as a disjoint entity.

13. The computer program product of claim 12, wherein the device is caused to identify a set of entities which have a shared token and merge the set of entities into a continuous entity, to transform the overlapping entities.

14. The computer program product of claim 12, wherein responsive to determining that the entity does not have a DB tag, the device is caused to determine whether the entity matches a syntactic pattern,
responsive to determining that the entity matches the syntactic pattern, the device is caused to apply the syntactic pattern, applying the syntactic pattern extracting the overlapping entities.

15. The computer program product of claim 14, wherein responsive to determining that the entity does not match the syntactic pattern, the device is caused to reconstruct a continuous entity.

\* \* \* \* \*